United States Patent Office 3,154,320
Patented Oct. 27, 1964

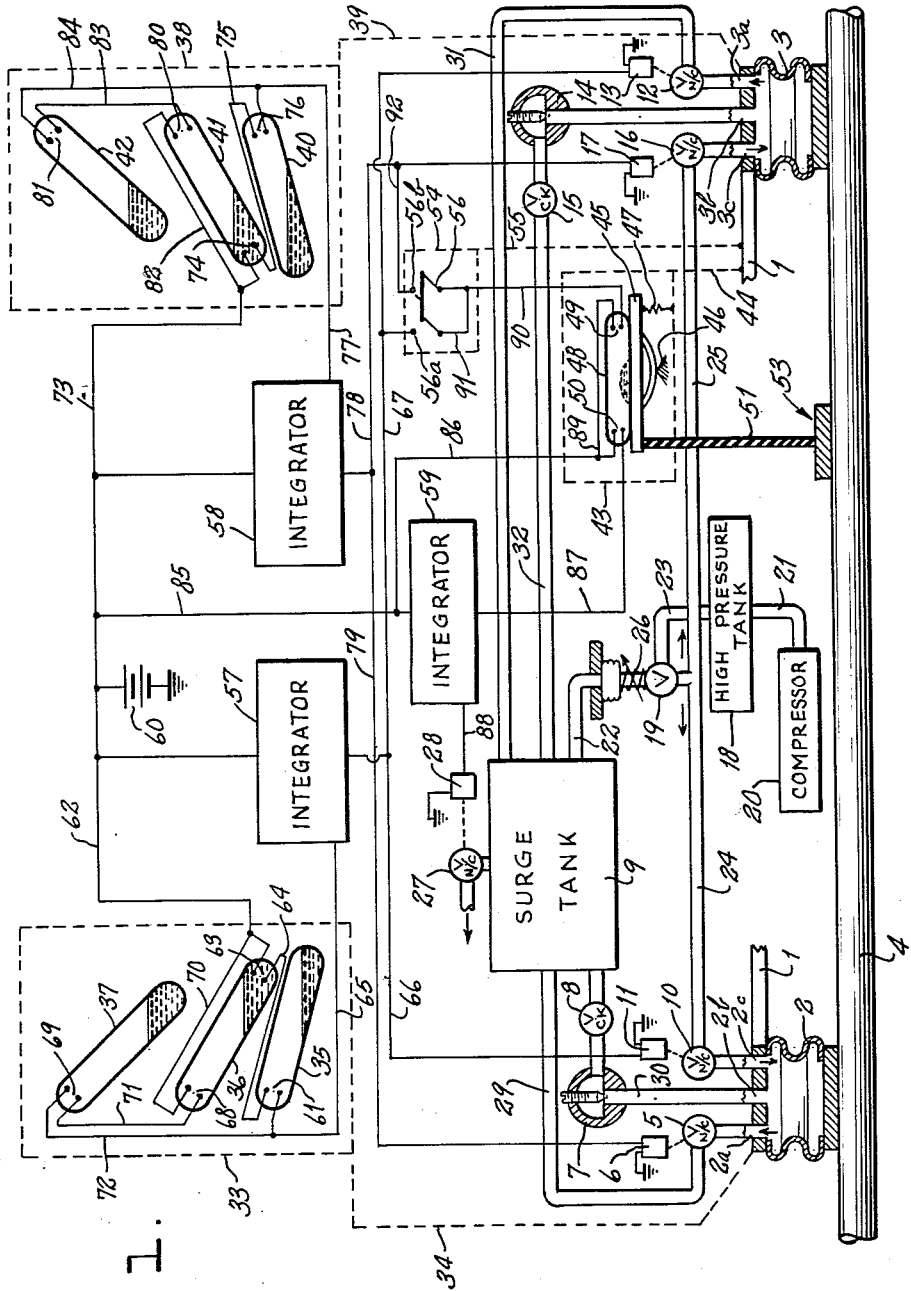

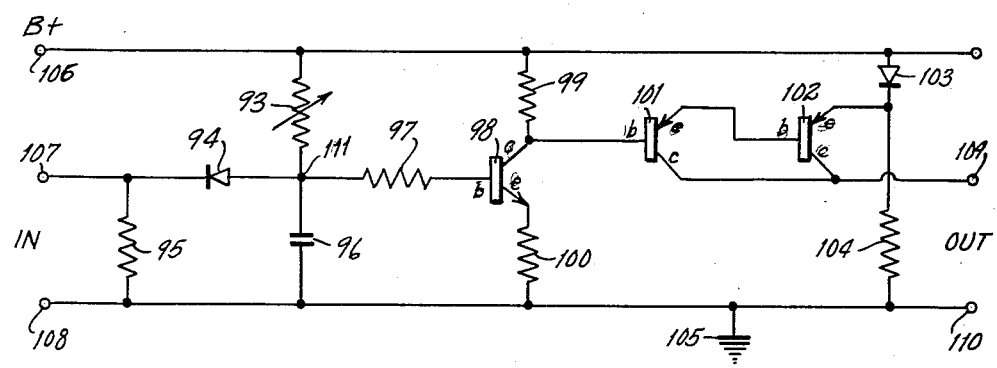

3,154,320
SWAY CONTROL APPARATUS
Leslie B. D'Avigdor, deceased, late of New York, N.Y., by Sydney J. Schwartz, executor, 50 Broad St., New York 4, N.Y.
Filed Sept. 13, 1962, Ser. No. 223,873
13 Claims. (Cl. 280—112)

This invention relates to sway control apparatus generally and is an improvement on the sway control apparatus shown and described in my Patents Nos. 2,934,553, issued April 26, 1960, 2,967,062, issued January 3, 1961, and 2,993,705, issued July 25, 1961.

The patents identified above disclose control apparatus for a pneumatic suspension system whereby the body of a vehicle may be maintained level even though the wheels of the vehicle may be at different levels. The control apparatus is responsive to lateral tilting and/or lateral acceleration such as accompanies the motion of a vehicle around a curve. The control apparatus regulates the suspension system so that there is produced a counter-tilting force which tends to balance the force of gravity and/or lateral acceleration. Thus where the vehicle body is subjected to tilting, the counter-tilting force causes the vehicle body to assume a relatively upright attitude. In the situation where the vehicle is subjected to lateral acceleration, the counter-tilting force causes the vehicle to "lean into" the curve.

Accordingly, it is an object of the present invention to provide improved sway control apparatus of the type described for producing a counter-tilting force to balance effectively the forces of gravity and/or lateral acceleration tending to tilt a vehicle body during normal operation.

Another object is to provide an improved suspension system whereby the counter tilt is produced by simultaneously increasing the fluid pressure in an expansible chamber supporting one side of the vehicle body and decreasing the fluid pressure in an expansible chamber supporting the other side of the vehicle body.

A further object is to provide an improved suspension system whereby the fluid in any expansible chamber with a pressure exceeding that of the system generally is gradually "bled off" to a common reservoir or surge tank until the pressures are equalized.

A further object is to provide improved apparatus of the type described including electronic means for delaying the response of the pneumatic suspension system to high frequency shocks due to irregularities in the surface of the road and other causes, so that the control apparatus is not activated by unbalancing forces, i.e. "jolts," of short duration.

The foregoing and other objects of the invention are attained in the apparatus described herein which includes apparatus for controlling a pneumatic suspension system associated with at least one transverse axle of the vehicle. The suspension system includes at least two pneumatic motors or expansible chambers for at least one axle, at least one expansible chamber being in proximity to each end of the axle and positioned between the axle and the vehicle body. A fluid such as air may be supplied to each expansible chamber through a normally closed inlet valve. There is provided an equalizing system comprising bleeder lines connected between each expansible chamber and a common reservoir or surge tank. When the pressure in an expansible chamber exceeds the surge tank pressure, fluid is gradually "bled off" to the surge tank until the pressures equalize. Naturally, the greater the pressure differential, the faster the fluid will "bleed off." For example, when a left hand turn has just been completed, if the fluid pressure in the right hand expansible chamber exceeds that of the surge tank, fluid will be "bled off" from that chamber until the pressure in that chamber equals that of the surge tank.

In the control apparatus, there are two sets of mercury switches each set responsive to a predetermined direction of tilting. In each set there is a series of normally open switches set at increasing angles to the horizontal. Thus for example, there may be three switches set at angles of 2°, 10° and 20° respectively.

If, while moving along a straight road, the vehicle tilts or while moving around a curve is subjected to lateral acceleration, the switch at the smallest angle with the horizontal is the first to close. When this switch closes, a signal is fed to an integrator and amplifier circuit where it is delayed and amplified. The output is transmitted to valve control means for the inlet valve of the expansible chamber on the outer side of the curve and valve control means for the outlet valve of the expansible chamber on the inner side of the curve. Upon activation, the valve control means open the valves, thus permitting an influx of high pressure fluid to the outer expansible chamber and a discharge of fluid from the inner expansible chamber to the surge tank. Thus by increasing the fluid pressure in the outer expansible chamber and by decreasing the fluid pressure in the inner expansible chamber, a counter-tilting force is produced which tends to balance the forces tending to tilt the vehicle.

If the vehicle continues to move around the curve and the forces of tilting and/or lateral acceleration reach a magnitude sufficient to cause the second mercury switches to close, the control of the system is shifted from the first mercury switch to the third mercury switch. During this intermediate stage where the second switch is closed and the third switch is open all valves remain closed and no additional counter-tilt force is applied. If the acceleration in the same direction continues and is sufficient to cause the third mercury switch to close, a signal is again transmitted to the integrator where it is delayed and amplified. The output is then transmitted to the appropriate valve control means. Once again the outlet valve of the inner expansible chamber and the inlet valve of the outer expansible chamber are opened to produce additional counter-tilt force.

As the counter-tilt force approaches a balance with the tilting force, the third mercury switch opens and produces an open circuit or no signal condition which causes the valves to close immediately thus tending to preserve the counter-tilt as the vehicle completes its curve. However, if during this period the fluid in any chamber has a pressure exceeding that of the surge tank, and the fluid in the outer chamber having recently received an influx of high pressure fluid is likely to satisfy this condition, the fluid in such chamber will gradually "bleed off" through the bleeder line to the surge tank. If the pressure in both chambers exceeds that of the surge tank both chambers will "bleed off" to the surge tank but the chamber with the greater pressure differential will "bleed off" faster. In either case, the tendency and overall effect is to equalize the pressure throughout the system. Therefore, as the vehicle moves on to a level straightaway, the pressures in the opposite chambers have already equalized to a degree so that the tendency to "overshoot" is minimized.

When an input signal is initially received by the integrator circuits as a result of the first or third mercury switch closing i.e. closed circuit condition, the integrator delays the transmission of an output signal to the valve control means. On the other hand, when there is open circuit or no signal condition such as when the first or third mercury switch opens or the second mercury switch closes, this fact is immediately, i.e. without time delay, transmitted to the valve control means.

It has been found that when a vehicle is traveling along a straight road, the resulting tilt of the vehicle will not normally be great enough to trip the second switch where that switch is set at a static angle of approximately 10°. On the other hand if the vehicle is rounding a curve and is subjected to lateral acceleration of normal proportions, it will be of sufficient magnitude to close the second and third mercury switches. It has been found that the gap in the response of the system provided by the second switch's shift of control of the system to the third switch works well in practice. This gap keeps the switches from being open during the entire turning period, thereby providing a second feature tending to minimize "overshooting."

Additional means are provided to control the general platform height of the vehicle body. Thus means are provided to keep the pressure within the suspension system and consequently the distance between the vehicle body and the axle below a reasonable maximum. One way of accomplishing this is by using another mercury switch which is responsive to the platform height and closes when the height reaches a predetermined maximum. This causes an input signal to be delivered to a third integrator. If the integrator time delay is exceeded, the integrator transmits an output signal to a valve control means which when activated opens a valve which vents the surge tank. This venting action occurs repeatedly during normal operation of the vehicle since the corrective action of the control system tends to effect an increase in the pressure throughout the suspension system with each activation of the valve control means.

The pressure in the system is to a degree governed by the action of a pressure regulated fluid flow valve which controls the flow of fluid from a high pressure reservoir to the inlet valves of the expansible chambers. The valve opening varies in inverse proportion to the fluid pressure in the surge tank i.e., the lower the surge tank pressure the wider the valve opening.

Means are also provided to enable the entire suspension system to be filled with air from the high pressure tank should it be so desired. The function of this means is to open both inlet and outlet valves to all expansible chambers so that the entire system is gradually filled with high pressure fluid. This for instance may be desirable during vehicle loading.

Other objects and advantages of the invention will become apparent from a consideration of the following specification and claims, together with the accompanying drawings.

In the drawings:

FIG. 1 is a wiring diagram of a sway control apparatus embodying the present invention, and FIG. 2 is a schematic diagram of an integrator circuit suitable for use in the apparatus of FIG. 1.

FIG. 1

This figure illustrates diagrammatically a portion of a vehicle equipped with a sway control system constructed in accordance with the present invention. The vehicle platform or body 1 rests on expansible chambers 2 and 3. Expansible chambers 2 and 3 are positioned between axle 4 and the vehicle platform or body 1. They serve to cushion the vehicle body 1 from the road shocks received by the vehicle axle. Such expansible chambers may be the principal suspension system of the vehicle or they may be supplementary to a more conventional type of suspension system, e.g., steel leaf springs. The term "body," as used herein is intended broadly to include any platform or load bearing structure and is not to be limited to a vehicle body in the narrow sense.

Expansible chamber 2 is provided with an outlet 2a, a bleeder line 2b and an inlet 2c. Outlet 2a is controlled by a valve 5, normally closed, which may be opened by energization of an electromagnet 6. Outlet 2a leads through valve 5 to a conduit 29 which in turn leads to a surge tank or common reservoir 9. Bleeder line 2b leads through a needle valve 7 to a conduit 30 and through a check valve 8 to a surge tank 9. Inlet 2c is controlled by a valve 10, normally closed, which may be opened by the energization of electromagnet 11. Inlet 2c is connected through valve 10 and a conduit 24 to a pressure regulated fluid flow valve 19. Pressure regulated valve 19 is connected to a high pressure tank 18, through a conduit 23. High pressure tank 18 is in turn connected to a compressor 20 through a conduit 21.

Expansible chamber 3 is provided with an outlet 3a, a bleeder line 3b and an inlet 3c. Outlet 3a is controlled by a valve 12, normally closed, which may be opened by energization of an electromagnet 13. Outlet 3a leads through valve 12 to a conduit 31 which in turn leads to surge tank 9. Bleeder line 3b leads through a needle valve 14 to a check valve 15 and a conduit 32 to surge tank 9. Inlet 3c is controlled by valve 16, normally closed, which may be opened by energization of an electromagnet 17. Inlet 3c is connected through valve 16 and a conduit 25 to pressure regulated fluid flow valve 19.

Pressure regulated fluid flow valve 19 controls the flow of high pressure air or other fluid from high pressure tank 18 to inlets 2c and 3c in response to the fluid pressure in surge tank 9. The fluid pressure in surge tank 9 is transmitted by conduit 22 to pressure regulated valve 19. This pressure is balanced against a manually adjustable spring 26 within valve 19 to control the valve opening. Thus, as the pressure in the surge tank 9 falls, the valve 19 opens proportionately, when inlet valves 10 and/or 12 are opened, fluid flows more freely from high pressure tank 18 into expansible chambers 2 and/or 3. Similarly as the pressure in the system and surge tank 9 rises, valve 19 closes proportionately. Therefore, when inlet valves 10 and/or 12 are opened, fluid flows less freely from high pressure tank 18 into expansible chambers 2 and/or 3. Valve 19 is balanced against both inlet and outlet pressures, i.e., so that the inlet pressure in conduit 23 and the outlet pressure in conduits 24 and 25 have no effect on the operation of valve 19.

Surge tank 9 may be vented to the atmosphere through a valve 27, normally closed, which may be opened by energization of an electromagnet 28.

A mercury switch panel 33 is mounted on the vehicle body 1, as indicated by dotted line 34. On mercury switch panel 33 there are mounted three mercury switches 35, 36 and 37 set at increasingly greater angles with the horizontal. For example they might be set at angles of 2°, 10° and 20°, respectively. However, these angles are given for illustrative purposes only and in fact the switches may be set at whatever angles provide optimum results. The switches on switch panel 33 are responsive to tilting and/or lateral acceelration acting toward the left as viewed in FIG. 1.

A second mercury switch panel 38 is mounted on the vehicle body 1 as indicated by dotted line 39. Mercury switch panel 38 has mounted thereon three mercury switches 40, 41 and 42 set at increasingly greater angles with the horizontal. Like the switches mounted on panel 33, these switches may be set at angles of 2°, 10° and 20°, respectively. The switches on switch panel 38 are responsive to tilting and/or lateral acceleration acting toward the right as viewed in FIG. 1.

A panel 43 is mounted on the vehicle body 1 as indicated by dotted line 44. On panel 43 there is mounted a pivoted arm 45 with the pivot point at 46. The right hand end of the arm 45 is connected to panel 43 by a spring 47. Mounted on pivoted arm 45 is a mercury switch 48. Mercury switch 48 has two sets of contacts 49 and 50 located respectively at opposite ends of switch 48. Spring 47 biases pivoted arm 45 so that switch contacts 49 are normally closed. The left hand end of the arm 45 is connected to a flexible element 51 of stretchable rubber. Flexible element 51 is in turn attached to the axle 4 as indicated at 53. As the vehicle body 1 rises, the flexible element 51 is stretched taut, and the force exerted by flexible element 51 on the pivoted arm 45 is sufficient to overcome the force of tension exerted by spring 47. The mercury in switch 48 then shifts to the left and closes switch contacts 50.

A panel 54 is also mounted on the vehicle body 1 as indicated by dotted line 55. Mounted on panel 54 is a courtesy switch 56 which may be operated either manually or automatically. For example, a suitable automatic operator might be associated with the vehicle body doors, so as to open the switch 56 when all the doors are closed, and close the switch when any door is open.

An integrator 57 is associated with the mercury switches on mercury switch control panel 33. Similarly integrators 58 and 59 are associated with mercury switch control panels 38 and 43 respectively. The function of integrators 57, 58 and 59 and the related circuitry will be explained below in the description of the operation.

Battery 60 provides the electrical potential needed for the integrators and the other electrical components of the system.

Operation

If the vehicle is tilted toward the left, as seen in FIGURE 1, and/or subjected to lateral acceleration acting toward the left, to such a degree that contacts 61 of mercury switch 35 are shorted by the mercury, then a circuit can be traced from the ungrounded terminal of battery 60 along wire 62, through contacts 63 of mercury switch 36, wire 64, contacts 61 of mercury switch 35 and wire 65 to integrator 57. The integrator serves to delay transmission of an output signal for a short period of time, such as for example, two-thirds of a second. The actual delay is determined by the circuit characteristics of the integrator and may be adjusted to whatever value is most practical for the vehicle concerned. If the duration of the tilting and/or lateral acceleration is sufficient to overcome the time delay period, then a positive signal condition is created and the signal coming through switch 35 is amplified by integrator 57 and transmitted through wire 66 and electromagnet 11 to ground and, at the same time, through wire 67 and electromagnet 13 to ground. On activation by the signal electromagnet 11 opens valve 10 allowing high pressure fluid to enter expansible chamber 2 through inlet 2c. On activation by the signal electromagnet 13 opens valve 12 allowing the fluid in expansible chamber 3 to escape through outlet 3a to the surge tank 9. The result is that the fluid pressure is increased in chamber 2 and decreased in chamber 3 thus producing a force tending to tilt the vehicle body 1. If this counter-tilting force is of sufficient strength to balance the original tilting force and to cause mercury switch 35 to open, the circuit from battery 60 to integrator 57 becomes open and a no-signal condition is created. The no-signal condition is immediately, i.e. without time delay, transmitted to electromagnets 11 and 13 causing valves 10 and 12 to close. The closing of valves 10 and 12 preserves the status quo of the pressure in expansible chambers 2 and 3, subject however to the equalization action of bleeder lines 2b and 3b which gradually bleed off any fluid pressure in excess of that in the surge tank 9.

If the corrective action of the system is insufficient to balance the tilting force and/or force of lateral acceleration, then force may develop of sufficient magnitude to close 10° mercury switch 36. Mercury switch 36 includes two sets of contacts, contacts 63 which are normally closed and contacts 68 which are normally open. If the net tilting and/or lateral acceleration force is of sufficient magnitude to produce a tilting force equivalent to or greater than 10°, switch contacts 63 are opened and switch contacts 68 are closed. This creates an open circuit and the resulting no-signal condition is immediately transmitted to electromagnets 11 and 13 causing valves 10 and 12 to close. The effect on the suspension system and on the exansible chambers 2 and 3 is the same as the effect, as described above, of the opening of mercury switch 35.

If the forces of tilting and/or lateral acceleration increase further and become sufficient to close contacts 69 in 20° mercury switch 37, then a circuit is again completed and may be traced from battery 60 along wires 62 and 70, through switch contacts 68, wire 71, switch contacts 69, and wires 72 and 65 to integrator 57. If the duration of that degree of force exceeds the time delay built into the integrator, then a positive signal condition is created and the signal is amplified and transmitted through electromagnet 11 and 13 to ground. The effect of this signal is the same as the effect outlined above of the signal resulting from the closing of switch 35. The result is that valves 10 and 12 are reopened, high pressure fluid is delivered to expansible chamber 2 and the fluid in expansible chamber 3 is allowed to escape to the surge tank. This corrective action is continued until the forces of counter-tilt have sufficiently balanced the tilting force to cause mercury switch 37 to open.

When mercury switch 37 opens, it produces an open circuit which creates a no-signal condition which, in turn, is transmitted immediately through integrator 57 to electromagnets 11 and 13. Consequently valves 10 and 12 immediately close. When the valves are all in their normally closed positions, the system tends to preserve the status quo. However, bleeder lines 30 and 31 gradually bleed off fluid from expansible chambers 2 and/or 3 if the pressure in them exceeds that of the surge tank 9. In other words, if pressure in expansible chamber 2 and/or 3 exceeds the fluid presure in the surge tank, then the fluid in that chamber or chambers will leak out through needle valve 7, check valve 8 and a bleeder line 30 and/or needle valve 14, check valve 15 and a bleeder line 31 to the surge tank. Needle valves 7 and 14 are adjustable according to the needs of the particular system. Thus the rate of fluid flow through the bleeder lines may be controlled by the setting of needle valves 7 and 14.

Check valves 8 and 15 preserve the pressure differential where the surge tank pressure exceeds that of expansible chamber 2 and/or 3. In other words, the "bleeding" occurs in one direction only namely towards the surge tank. Thus in the situation where tilting action tends to lower the left hand side of the body 1 and the counter-tilt action tends to expand chamber 2 to raise that left hand side of the body 1, then the check valve 15 will keep the fluid under higher pressure in the surge tank from bleding into expansible chamber 3. (Note that the bleeding of high pressure air from chamber 2 would tend to raise the pressure in the surge tank, and it is desirable to prevent that increased pressure from being communicated to chamber 3.)

As the tilt decreases sufficiently to close contacts 63 of mercury switch 36, once again a circuit is completed to integrator 57. The circuit may be traced from battery 60 through wire 62, contacts 63 of mercury switch 36, wire 64, contacts 61 of mercury switch 35, and wire 65 to integrator 57. If the signal is of sufficient duration in time to exceed the time delay, a positive signal condition is created and an output signal is transmitted through electromagnets 11 and 13 to ground causing valves 10 and 12 to open. The result is that a counter-tilt force is again created through the transmission of high pressure air to expansible chamber 2 and the escape of high pressure air from expansible chamber 3 to the surge tank 9. This counter tilt will continue until the degree of lateral acceleration and/or tilting drops below the 2° level. However, it has been found that if the vehicle is approaching completion of a curve and is about to enter upon a straight stretch of road, the time delay will not be exceeded as the tilting forces decrease so that additional counter-tilting force will not be applied just as the vehicle body is about to level off.

When the forces of tilting and/or lateral acceleration fall below the equivalent of a 2° tilt, contacts 61 of mercury switch 35 open and an open circuit is created. Thus electromagnets 11 and 13 are deactivated and valves 10 and 12 close. At this point, the vehicle body is virtually level, that is, its effective degree of tilt is less than 2°. If the fluid pressure in expansible chamber 2 and/or expansible chamber 3 exceeds the fluid pressure in surge tank 9, fluid will bleed into surge tank 9 until the pressures equalize.

If the tilting and/or lateral acceleration forces act toward the right hand side of FIG. 1 then mercury switch panel 38 controls the pneumatic suspension system. If the force is of sufficient magnitude to cause contacts 76 of 2° mercury switch 40 to close, than a complete circuit may be traced from battery 60 through wire 73, contacts 74 of mercury switch 41, wire 75, contacts 76 of mercury switch 40, and wire 77 to integrator 58. Integrator 58 is identical to integrator 57 and has a time delay of the same duration as integrator 57. Should the signal resulting from the closing of mercury switch 40 be of sufficient duration to exceeed the time delay, a positive signal condition results and an amplified output signal wil be transmitted from integrator 58 through wire 78 and electromagnet 17 to ground. When electromagnet 17 is activated it causes valve 16 to open, and permits high pressure air to enter expansible chamber 3. At the same time a signal is delivered through wire 79 and electromagnet 6 to ground. When electromagnet 6 is activated, it causes valve 5 to open and permits the fluid in expansible chamber 2 to flow into the surge tank 9. The result is that the fluid pressure is increased in chamber 3 and decreased in chamber 2 thus producing a force tending to lift the right hand side of vehicle body 1. If this force of counter-tilt is of sufficient magnitude to balance the tilting force and to cause contact 76 of mercury switch 40 to open, the circuit from battery 60 to integrator 58 becomes open and creates a no-signal condition. The no-signal condition is immediately transmitted to electromagnets 6 and 17 causing valves 5 and 16 to close. This preserves the pressure status quo subject to the bleeder action described above.

If the tilting and/or lateral acceleration forces exceed the forces of counter-tilt to a degree sufficient to cause 10° mercury switch 41 to close, then switch contacts 74 open and switch contacts 80 close. This creates an open circuit, and the resulting no-signal condition is immediately transmitted to electromagnets 6 and 17. Thus electromagnets 6 and 17 are deactivated and valves 5 and 16 close.

If the forces of tilting and/or lateral acceleration continue to increase and reach a magnitude sufficient to cause contacts 81 of mercury switch 42 to close, a circuit is completed running from battery 60 through wires 73 and 82, mercury switch contacts 80, wire 83, mercury switch contacts 81, and along wires 84 and 77 to integrator 58. If the duration of that degree of force is sufficient ot exceed the time delay, integrator 58 transmits an amplified signal through electromagnets 6 and 17 to ground. The remainder of the operation of the suspension system in response to conditions reflected by mercury switch panel 38 is analogous to the operation of the suspension system in response to the various conditions of mercury switch panel 33 and does not need further explanation here.

Since each transmission of a signal from integrator 57 and 58 results in the admission of additional high pressure fluid into the suspension system, the overall effect is to gradually increase the pressure in the system and the platform height to the point where flexible element 51 is stretched taut, and, overcoming the bias on arm 45 created by spring 47, element 51 causes pivoted arm 45 to tilt to the left. This opens switch contacts 49 and closes switch contacts 50. A complete circuit then may be traced from battery 60 along wires 85 and 86, through switch contacts 50, wire 87 to integrator 59. If the signal continues long enough to exceed the time delay built in integrator 59, and amplified signal is then transmitted along wire 88 through electromagnet 28 to ground which when activated opens valves 27 resulting in the venting of the surge tank and hence of the system. The valve 27 will remain open until the general body height drops low enough to allow spring 47 to tilt pivoted arm 45 to the right causing switch contacts 50 to open and contacts 49 to close. At this point, the circuit breaks and the open circuit and no-signal condition is immediately transmitted through integrator 59 to electromagnet 28 causing valve 27 to close.

Consequently, when the vehicle is running, the spacing between the body and the axle is maintained very closely at a value which just opens the contacts 50 of switch 48. If the spacing exceeds that value, the contacts 50 are closed and the tank 9 vented to reduce the spacing to the desired value. Since the sway control system acts continuously to increase the pressure in tank 9, it may be seen that the body-axle spacing is maintained constant by a dynamic control system. The changes in spacing which are effective to open and close the contacts 50 are so small that they cannot be noticed by occupants of the vehicle.

If preparatory to the loading of the vehicle, or for any other reason, it is desired to raise the general platform height to a loading position, it may be accomplished by closing switch 56. Switch 56 may be operable automatically, by the opening of a platform door for instance, or it may be manually operable. When switch 56 is closed, a circuit may be traced from battery 60, along wires 85, 86, and 89, through switch contact 49, which is normally closed, along wires 90 and 91 through switch contacts 56a, wires 66 and 67, and electromagnets 11 and 13 to ground. This causes valves 10 and 12 to open. At the same time a circuit is completed through switch contacts 56b, wires 92, 78 and 79, and electromagnets 6 and 17 to ground, activation of electromagnets 6 and 17 and causes valves 5 and 16 to open. Thus the effect of the closing of switch 56 is to open all valves in the system. This means that high pressure air or fluid is fed into both expansible chambers and is allowed to escape from both expansible chambers to surge tank 9. This produces a net increase in pressure through the system and raises the platform height until it reaches the point where mercury switch 49 opens.

FIG. 2

FIG. 2 shows a wiring diagram of an integrator circuit. Since all integrator circuits are identical in structure, only one, integrator 57 is here described. Essentially it consists of a capacitive integrator stage, and three amplifier stages.

The capacitive integrator stage includes variable resistor 93, diode 94, resistor 95 and capacitor 96. The first amplifier stage includes base biasing resistor 97, transisitor 98 connected in a common emitter circuit configuration, collector biasing resistor 99 and emitter biasing resistor 100. The first amplifier stage is coupled directly to the second amplifier stage whcih includes transistor 101. Transistor 101 is coupled directly to the power output stage which comprises transistor 102, diode 103 and resistor 104. Circuit ground is indicated at 105.

*Operation*

During those periods when no input signal is being delivered to integrator 57, current flows from the B+ terminal 106, through variable resistor 93, diode 94, and resistor 95 to ground 105. When mercury switch 35 closes, a signal is transmitted to integrator 57 through input terminal 107. Since this signal is of sufficient magnitude to reverse bias diode 94, current flow through diode 94 is immediately blocked. The current flow through resistor 93 decreases, so that potential at junction 111 tends to swing in a positive sense. The rise in voltage at junction 111 is delayed by capacitor 96, which tends to hold the potential at 111 at its previous level, and which must be charged by current flowing through resistor 93 in order for the potential at 111 to increase. The time delay of the control system is a function of the time required to build up the charge on capacitor 96 and is hence a function of the capacitance of capacitor 96 and of the resistance of resistor 93. For a given capacitor the time delay may be varied by changing the setting of variable resistor 93.

The two voltage dividers, consisting respectively of resistors 99 and 100, and resistors 93 and 95, are related so that during the time when diode 94 is conducting, the emitter-base electrodes of transistor 98 are reverse biased and that transistor is cut off. However, as the charge on capacitor 96 rises, the potential at base 98b of transistor 98 also increases. Eventually, the emitter-base bias swings forward and transistor 98 conducts. Transistor 98 amplifies the signal received at 98b. The output of transistor 98 is directly coupled from its collector 98c to base 101b of transistor 101 where it is amplified again. The output of the second amplifier stage is coupled from collector 101c directly to output terminal 109 where it appears as a positive signal. Transistor 102 is effectively in parallel with transistor 101 and operates concurrently with it to supply additional current to the terminal 109. Output terminal 110 is connected to circuit ground 105.

When the input signal to terminals 107 and 108 is cut off, conduction immediately begins again through diode 94 and resistor 95 to ground. Capacitor 96 discharges quickly through diode 94, and the potential at 107 and hence 98b immediately drops and transistor 98 is cut off. The current output at 109 immediately drops a value too low to energize the electromagnets 11 and 13. This insures that there is no time delay in transmitting the no-signal condition to the valve regulating means.

Any signal received at input terminals 107 and 108 whether resulting from the closing of mercury switch 35 or mercury switch 37 has the same effect on integrator circuit 57 as the effect of the signal outlined above. By the same token, any open-circuit whether resulting from the opening of any one of mercury switches 35, 36 or 37, produces the same effect on integrator circuit 57 as the effect of the no-signal condition outlined above.

If the vehicle should be traveling along a bumpy surface, and the irregularities close the switch 35 at a relatively high frequency, the functioning of the system will not be impaired. Since the time delay depends on the time it takes to build up the charge on capacitor to discharge completely, it can readily be seen that the time delay cannot be overcome by a series of signals at short intervals but only by a continuous signal. Thus the sway control system operates effectively on irregular surfaces as well as on smooth surfaces.

The integrator circuit described above is merely one of the many different integrator circuits that may be used in this system. Any circuit performing substantially the same functions as the above could be substituted without departing from the scope of the invention.

What is claimed as new is:

1. Sway control apparatus for a vehicle having a transverse axle and a body, comprising:
   (a) first and second motor means on opposite sides of the vehicle for applying a force tending to move the body generally vertically with respect to the axle;
   (b) each said motor means comprising at least one expansible chamber;
   (c) means for supplying a fluid to each said chamber; including:
      (1) a normally closed inlet valve;
      (2) a normally closed outlet valve;
   (d) first and second control means responsive respectively to lateral tilting and/or acceleration in one sense and in the opposite sense, each said control means movable between a normal control position and an active control position, said first and second control means each comprising:
      (1) first, second and third control elements each operable between a normal control position and and an active control position in response respectively to relatively small, intermediate and large resultants of tilting and/or lateral acceleration;
      (2) said first control element serving when actuated to place the control means in active position;
      (3) said second control element serving when actuated to shift control of the control means from the first control element to the third control element thereby placing the control means in normal position, and
      (4) said third control element serving when actuated to place the control means in active position;
   (e) first valve operating means responsive to the active control position of the first control means to open the inlet valve of each expansible chamber of said first motor means and the outlet valve of each expansible chamber of said second motor means, and
   (f) second valve operating means responsive to the active control position of the second control means to open the inlet valve of each expansible chamber of the second motor means and the outlet valve of each expansible chamber of the first motor means.

2. Sway control apparatus as defined in claim 1, in which
   (a) said first, second and third control elements are first, second and third mercury switches mounted on the vehicle body,
   (b) said first, second and third switches being placed at relatively small, intermediate and large angles respectively, with a horizontal plane.

3. Sway control apparatus for a vehicle having a transverse axle and a body, comprising:
   (a) first and second motor means on opposite sides of the vehicle for applying a force tending to move the body generally vertically with respect to the axle;
   (b) each said motor means comprising at least one expansible chamber;
   (c) means for supplying a fluid to each said chamber; including:
      (1) a normally closed inlet valve;
      (2) a normally closed outlet valve;
   (d) first and second control means responsive respectively to lateral tilting and/or acceleration in one sense and in the opposite sense, each said control means movable between a normal control position and an active control position;
   (e) first valve operating means responsive to the active control position of the first control means to open the inlet valve of each expansible chamber of said first motor means and the outlet valve of each expansible chamber of said second motor means;
   (f) second valve operating means responsive to the active control position of the second control means to open the inlet valve of each expansible chamber of the second motor means and the outlet valve of each expansible chamber of the first motor means;
   (g) said first and second valve operating means each comprising:
      (1) an integrator circuit,
      (2) valve opening means,
      (3) said integrator circuit comprising a time delay means, and
      (4) said integrator circuit responsive to the active control position of the control means and subject to the regulation of the time delay means to activate the valve opening means controlled by said valve operating means.

4. Sway control apparatus as defined in claim 3, in which said valve opening means consist essentially of an electromagnet for each valve controlled by said valve operating means.

5. Sway control apparatus for a vehicle having a transverse axle and a body, comprising:
 (a) first and second motor means on opposite sides of the vehicle for applying a force tending to move the body generally vertically with respect to the axle;
 (b) each said motor means comprising at least one expansible chamber;
 (c) means for supplying a fluid to each said chamber; including:
  (1) a normally closed inlet valve;
  (2) a normally closed outlet valve;
 (d) first and second control means responsive respectively to lateral tilting and/or acceleration in one sense and in the opposite sense, each said control means movable between a normal control position and an active control position;
 (e) first valve operating means responsive to the active control position of the first control means to open the inlet valve of each expansible chamber of said first motor means and the outlet valve of each expansible chamber of said second motor means;
 (f) second valve operating means responsive to the active control position of the second control means to open the inlet valve of each expansible chamber of the second motor means and the outlet valve of each expansible chamber of the first motor means; and
 (g) means for opening at the same time all inlet and outlet valves of the expansible chambers.

6. Apparatus as defined in claim 5 in which the normally closed outlet valve is connected to the common reservoir.

7. Sway control apparatus for a vehicle having a transverse axle and a body, comprising:
 (a) first and second motor means one on each side of the vehicle for applying force tending to move the corresponding side of the body vertically with respect to the axle;
 (b) each said motor means comprising at least one expansible chamber for holding an expansible fluid; and
 (c) means for regulating the pressure of the expansible fluid within each said chamber including
  (1) a common reservoir,
  (2) a normally open bleeder line connecting each expansible chamber with the common reservoir,
  (3) a restriction in each bleeder line for regulating the gradual flow of expansible fluid under pressure in excess of the pressure in the common reservoir from each expansible chamber to the common reservoir,
  (4) a normally closed inlet valve connected to a source of fluid under high pressure, and
  (5) a normally closed outlet valve.

8. Apparatus as defined in claim 7 in which there is included valve means regulated by the pressure of the common reservoir for controlling the flow of high pressure fluid from said source of fluid under high pressure to the inlet valves of the expansible chambers.

9. Sway control apparatus for a vehicle having a transverse axle and a body comprising
 (a) first and second motor means one on each side of and in supporting relation with the vehicle body for applying force tending to move the body generally vertically with respect to the axle,
 (b) each said motor means comprising at least one expansible chamber for holding fluid and
 (c) means for regulating the quantity of fluid within each said chamber including:
  (1) a normally closed inlet valve, and
  (2) a normally closed outlet valve;
 (d) first and second control means responsive respectively to lateral tilting and/or acceleration in one sense and in the opposite sense, each said control means movable between a closed circuit position and an open circuit position;
 (e) first and second integrator means each including:
  (1) time delay means, said first and second integrator means responsive respectively to said first and second control means and subject to the regulation of the time delay means, each said integrator means operable between a positive signal condition in response to a closed circuit position of said control means and a no signal condition in response to an open circuit position of said control means;
 (f) first valve control means responsive to a positive signal condition in the first integrator means to effect operation of the motor means tending to balance the lateral tilting and/or acceleration in the one sense, and
 (g) second valve control means responsive to a positive signal condition in the second integrator means to effect operation of the motor means tending to balance the lateral tilting and/or acceleration in the opposite sense.

10. Sway control apparatus for a vehicle having a transverse axle and a body comprising:
 (a) first and second motor means one on each side of and in supporting relation with the vehicle body for applying force tending to move the body generally vertically with respect to the axle;
 (b) each said motor means comprising at least one expansible chamber for holding fluid;
 (c) means for regulating the quantity of fluid within each said chamber including:
  (1) a normally closed inlet valve in each chamber,
  (2) a normally closed outlet valve in each chamber,
  (3) a common reservoir connected to each chamber,
  (4) means effective for gradually equalizing the fluid pressure within the chambers and the common reservoir,
 (d) first and second control means responsive respectively to lateral tilting and/or acceleration in one sense and in the opposite sense, each said control means movable between a closed circuit position and an open circuit position;
 (e) first and second integrator means responsive respectively to said first and second control means, each said integrator means operable between a positive signal condition in response to a closed circuit position of said control means and a no signal condition in response to an open circuit position of said control means;
 (f) first valve control means responsive to a positive signal condition in the first integrator means to effect operation of the motor means tending to balance the lateral tilting and/or acceleration in the one sense, and
 (g) second valve control means responsive to a positive signal condition in the second integrator means to effect operation of the motor means tending to balance the lateral tilting and/or acceleration in the opposite sense.

11. Sway control apparatus as defined in claim 10 in which the means effective for gradually equalizing the fluid pressure within said chambers and the common reservoir comprise bleeder lines connected between each chamber and the common reservoir.

12. Sway control apparatus for a vehicle having a transverse axle and a body, comprising:
 (a) first and second motor means one on each side of and in supporting relation with the vehicle body for applying force tending to move the body generally vertically with respect to the axle;

(b) each said motor means including at least one expansible chamber for holding a fluid;
(c) means for regulating the fluid pressure within said chambers including:
(1) a normally closed inlet valve for each chamber, and
(2) a normally closed outlet valve for each chamber;
(d) a source of high pressure fluid connected to the inlet valves;
(e) a common reservoir connected to the outlet valves;
(f) means for regulating the fluid pressure within the common reservoir, including a normally closed reservoir outlet valve;
(g) bleeder means connected between the common reservoir and each chamber for gradually reducing the fluid pressure in any chamber with fluid pressure bleeding that of the common reservoir;
(h) first and second control means responsive respectively to lateral tilting and/or acceleration in one sense and in the opposite sense, each said control means movable between a closed circuit position and an open circuit position;
(i) first and second integrator means responsive respectively to said first and second control means, each said integrator means operable between a positive signal condition in response to a closed circuit position of said control means and a no signal condition in response to an open circuit position of said control means;
(j) first valve control means responsive to a positive signal condition in the first integrator means to open the inlet valve of each expansible chamber of the first motor means and the outlet valve of each expansible chamber of the second motor means;
(k) a second valve control means responsive to a positive signal condition in the second integrator means to open the outlet valve of each expansible chamber of the first motor means and the inlet valve of each expansible chamber of the second motor means;
(l) third control means responsive to the general vehicle body height with respect to the axle, said control means movable between a closed circuit position and an open circuit position;
(m) third integrator means responsive to the third control means, said third integrator means operable between a positive signal condition in response to the closed circuit position of said third control means and a no signal condition in response to the open circuit position of said third control means;
(n) third valve control means responsive to a positive signal condition in the third integrator to open the outlet valve of the common reservoir, and
(o) means for opening at the same time all inlet and outlet valves of the expansible chambers.

13. Sway control apparatus for a vehicle having a transverse axle and a body comprising:
(a) first and second motor means one on each side of and in supporting relation with the vehicle body for applying force tending to move the body generally vertically with respect to the axle;
(b) each said motor means comprising at least one expansible chamber for holding fluid;
(c) means for regulating the quantity of fluid within each said chamber including:
(1) a normally closed inlet valve in each chamber,
(2) a normally closed outlet valve in each chamber,
(3) a common reservoir connected to each chamber, and
(4) means effective for gradually reducing the fluid pressure in any chamber where the fluid pressure of that chamber exceeds that of the common reservoir;
(d) first and second control means responsive respectively to lateral tilting and/or acceleration in one sense and in the opposite sense, each said control means movable between a closed circuit position and an open circuit position;
(e) first and second integrator means responsive respectively to said first and second control means, each said integrator means operable between a positive signal condition in response to a closed circuit position of said control means and a no signal condition in response to an open circuit position of said control means;
(f) first valve control means responsive to a positive signal condition in the first integrator means to effect operation of the motor means tending to balance the lateral tilting and/or acceleration in the one sense; and
(g) second valve control means responsive to a positive signal condition in the second integrator means to effect operation of the motor means tending to balance the lateral tilting and/or acceleration in the opposite sense.

References Cited in the file of this patent

UNITED STATES PATENTS

| | | |
|---|---|---|
| 2,957,702 | Heiss | Oct. 25, 1960 |
| 2,960,349 | Vogel | Nov. 15, 1960 |

FOREIGN PATENTS

| | | |
|---|---|---|
| 891,866 | Great Britain | Mar. 21, 1962 |